United States Patent
Honzek

(10) Patent No.: US 8,511,711 B2
(45) Date of Patent: Aug. 20, 2013

(54) CARRIER FRAME OF A UTILITY VEHICLE

(75) Inventor: Robert Honzek, Oberthingau (DE)

(73) Assignee: AGCO GmbH, Marktoberdorf (DE)

( * ) Notice: Subject to any disclaimer, the term of this patent is extended or adjusted under 35 U.S.C. 154(b) by 188 days.

(21) Appl. No.: 12/741,850

(22) PCT Filed: Oct. 24, 2008

(86) PCT No.: PCT/EP2008/009018
§ 371 (c)(1),
(2), (4) Date: Jul. 7, 2010

(87) PCT Pub. No.: WO2009/059699
PCT Pub. Date: May 14, 2009

(65) Prior Publication Data
US 2010/0270785 A1    Oct. 28, 2010

(30) Foreign Application Priority Data
Nov. 8, 2007   (DE) .......................... 10 2007 053 324

(51) Int. Cl.
*B62D 21/00*    (2006.01)
*B62D 21/12*    (2006.01)

(52) U.S. Cl.
USPC ........... 280/785; 180/312; 280/781; 280/790; 296/204

(58) Field of Classification Search
USPC ................. 172/776; 180/291, 311, 312, 900; 280/781, 785, 789, 790, 760; 296/25, 184.1, 296/203.01, 204
See application file for complete search history.

(56) References Cited

U.S. PATENT DOCUMENTS

| 1,243,255 | A | * | 10/1917 | Campbell | 280/794 |
| 2,167,848 | A | * | 8/1939 | Ostenberg | 280/781 |
| 4,151,920 | A | * | 5/1979 | Shoup | 414/697 |
| 4,386,792 | A | * | 6/1983 | Moore et al. | 280/781 |
| 4,585,084 | A | * | 4/1986 | van der Lely | 180/53.1 |
| 4,679,634 | A | * | 7/1987 | Bulmahn | 172/250 |
| 4,726,440 | A | * | 2/1988 | Kamlukin et al. | 180/312 |
| 5,149,132 | A | * | 9/1992 | Ruehl et al. | 280/800 |
| 5,561,902 | A | * | 10/1996 | Jacobs et al. | 29/897.2 |
| 5,741,026 | A | * | 4/1998 | Bonnville | 280/781 |
| 6,003,935 | A | * | 12/1999 | Kalazny | 296/204 |
| 6,398,261 | B1 | * | 6/2002 | Ammer et al. | 280/781 |
| 6,871,875 | B2 | * | 3/2005 | Grimm et al. | 280/785 |
| 6,962,390 | B1 | * | 11/2005 | Myers et al. | 296/205 |
| 7,192,081 | B2 | * | 3/2007 | Tijerina et al. | 296/205 |

(Continued)

FOREIGN PATENT DOCUMENTS

| CZ | 9904708 A3 | * | 8/2001 |
| DE | 2714017 | | 10/1978 |

(Continued)

OTHER PUBLICATIONS

International Search Report from Application No. PCT/EP2008/009018 Dated Mar. 2, 2009.

*Primary Examiner* — Joseph Rocca
*Assistant Examiner* — Laura Freedman

(57) ABSTRACT

A utility vehicle (1) comprising a carrier frame (3) mounted above a transaxle (2) is provided. The carrier frame (3) comprises a first carrier frame section (30) and a second carrier frame section (40). A height level of the first carrier frame section (30) differs from a height level of the second carrier frame section (40).

13 Claims, 6 Drawing Sheets

(56) References Cited

U.S. PATENT DOCUMENTS

| | | | |
|---|---|---|---|
| 7,389,844 B2 * | 6/2008 | Van Der Bijl | 180/291 |
| 7,559,402 B2 * | 7/2009 | Jennings et al. | 180/312 |
| 8,011,466 B2 * | 9/2011 | Honzek et al. | 180/68.4 |
| 2006/0108784 A1 | 5/2006 | Van Der Bijl | |

FOREIGN PATENT DOCUMENTS

| | | | |
|---|---|---|---|
| DE | 2714017 A | * | 10/1978 |
| DE | 3312446 | | 10/1984 |
| DE | 3312446 A1 | * | 10/1984 |
| WO | 9514603 | | 6/1995 |
| WO | WO 9514603 A1 | * | 6/1995 |

* cited by examiner

CARRIER FRAME OF A UTILITY VEHICLE

FIELD OF INVENTION

The present invention relates to a carrier frame, in particular to a carrier frame of a utility vehicle.

BACKGROUND OF THE INVENTION

With conventional agricultural tractors etc., the housings of the drive train serve simultaneously as the load-bearing structure of the vehicle. These housings include, for example, a rear axle housing, a transmission housing, a clutch housing, an oil sump, and a front axle housing. All the housings are bolted to one another and therefore form a structural combination on which a cab, a radiator arrangement with heat exchanger, radiator fan and surrounding structures, an engine etc. are mounted. In addition, at both ends of the tractor hydraulic lifting devices are usually attached to the housings, which are generally designated as front and rear power lifting devices.

In specific travel situations in uneven terrain front and rear axles are restricted, with the result that high torsion forces are exerted on the load-bearing housing combination. If the vehicle is ballasted at the front and has a heavy attachment device secured to the rear, which is raised from the ground, there is an additional flexural stress imposed on the load-bearing transmission train combination in the direction of travel. The scale of these forces and torsions increases with the distance between the rear axle and the front axle. These forces can only be absorbed by the housings to a certain degree. Because the distance between the wheel axles is constantly increasing, in particular with vehicles with high engine capacity, and because with these vehicles the stress is also increasing as a result of equipment attachments becoming larger and larger, this type of design is encountering its structural limits.

From CZ 288 674, in addition to the housing combination, a carrier frame is provided, which is bolted to the housing combination over the length of the vehicle and therefore absorbs the stresses referred to above. This carrier frame is located above the transmission combination and results in an increase in the structural space required, since the radiator arrangement etc. is placed on this frame. Specifically in the area of the front of the vehicle, in the area of which the radiator arrangement and the engine are placed, the vehicle becomes perceptibly higher. Due to the high vehicle engine cover there is only a restricted free view to the front. This is of particular importance if equipment attachments are located in the front area of the vehicle which the driver must be able to observe in order, for example, to stay on track or be able to identify obstacles. In addition to this, there is the risk that, in part, the provisions of the law regarding a free view of the area in front of the vehicle engine cover can no longer be respected.

The design shown in CZ 288 674 of a carrier frame running continuously from front to rear accordingly requires a perceptible increase in the height of the vehicle, in particular in the area of the vehicle front, which results in an impairment of the driver's view to the front.

SUMMARY OF THE INVENTION

The object of the present invention is to provide a carrier frame which is designed in such a way that the impediment to the view in the front part of the vehicle due to a high engine cover is minimised. Advantageously, it is intended that the dismantling/installation of the carrier frame and the preliminary installation of the modules associated with it on the individual sections of the carrier frame should be made easier or made possible.

According to the invention there is provided a utility vehicle comprising a carrier frame mounted above a transaxle which comprises a transmission unit and two axles, the carrier frame comprising a first section and a second section, wherein a height level of the first section is lower than a height level of the second section.

A carrier frame according to the invention has a first carrier frame section and a second carrier frame section, which are located at different height levels. In this way it is possible to locate the carrier frame in one direction. The centre of gravity of the vehicle is therefore relocated downwards, as a result of which a better road position is achieved. In addition to this, installed items such as the engine or the radiator arrangement can likewise be installed on a lower level, as a result of which the vehicle becomes lower in the front area and the driver is able to achieve a better line of sight. In this design, the front part of the frame is supported horizontally at the height of the front power lifting device point of rotation on the transaxle, such that, in push operational mode, negligible flexural torque forces occur on the frame part.

In order to ensure the possibility of attaching/removing implements with different manufacturers and vehicle types, the design layout of the front and rear power lifting devices (or linkage) is determined in ISO 730. According to this, the height of the attachment point of a lift arm of a conventional size category, with the arm lowered to its maximum, is a maximum of 200 mm from the ground. This ensures that implements can be attached simply by lowering the lift arms and aligning the attachment points thereby allowing the operator to make the attachment without having to intervene in the danger area.

This maximum permissible height above the ground means that the lift arms of the front linkage or their point of rotation respectively must lie very low in comparison with the vehicle. With standard tractors with front tyres of a maximum of 34 inches (tyre diameter approx. 1,550 mm), the point of rotation of the lift arms can be selected in such a way that it lies at the height of the front axle and ISO 730 is still fulfilled. If with larger vehicle types the front tyres are larger, or the point of rotation, is located higher, then it would be necessary, with a frame with a continuous height level, for an L-shaped limb to be formed or fitted pointing downwards. As a result, in particular in push operation, such as when using a snow clearance device or a ground roller which cause a force effect in the horizontal direction, a high moment of flexure is imposed on this limb. The corresponding bracing elements between the frame and the limb for transferring these flexure moments require a large amount of construction space. The same restrictions regarding the distance interval from the ground also result for the power take-off shaft. In this case, too, the height position is limited by regulations. Due to the stepped shape of the carrier frame according to the invention, no additional bracing elements are required.

If the first frame section and the second frame section are additionally connected to one another in a detachable manner, advantages result with regard to the dismantling/installation of the individual sections and the modules attached to them respectively. For example, the radiator arrangement, including the piping, and also the front power lifting mechanism and the front power take-off shaft, which is likewise located on the carrier frame, can be mounted beforehand onto the section which is built into the front part of the vehicle by what is referred to as off-line installation, and is only located onto the remaining carrier frame sections in the course of the assembly of the vehicle, in what is referred to as on-line installation. By means of preliminary installation of the radiator arrangement off-line, it is also guaranteed that the fitters can carry out the installation at an ergonomic operating height, which with on-line installation can only be carried out by means of lifting platforms. Due to the increased scope of preliminary installation, the run-through time on-line is shortened, which results in costs being saved. Repairs also, such as to the axles, can therefore be carried out more efficiently, since they are more easily accessible thanks to the easier dismantling of the carrier frame section located in front of them.

A further possibility is for a carrier frame section to be further subdivided and put into effect with detachable connections. The dismantling/installation is in this way further simplified and the manufacturing costs of the individual frame parts reduced.

In a preferred embodiment the second section comprises a first subsection disposed forwardly of, and lower than, a second subsection, wherein the first section is mounted to the first subsection. Preferably, the transmission unit is located between the two axles, wherein the first subsection is located at or below the height level of the transmission unit. This provides a three-level carrier frame which a profile which can advantageously cooperate with the upper profile of the underlying transaxle.

An engine may advantageously be mounted above the first subsection so as to lower the centre of mass of the vehicle. Preferably, a cab is mounted above the second subsection. This exploits the height of the second subsection which is necessary to accommodate the underlying transmission unit.

If the height levels of the carrier frame sections descend outwards from the middle of the vehicle, it is possible, as well as the lowering of the engine and the radiator arrangement or other modules respectively, and the optimisation of the line of sight associated with this, for equipment units fitted on the other side of the vehicle, for example, also to be installed as low as possible. In this way, flexural forces can be reduced, as well as vision in this direction also being improved.

Advantageously, the pre-installed module is provided on the second carrier frame section in front of the front axle of the vehicle in the direction of travel. In this way, the axle does not restrict the frame section in terms of the installation height. The frame section can be provided at or below the height level of the front axle. The same naturally applies to the rear axle too.

Advantageously, the first and the second carrier frame section can be connected by means of a flange connection. All necessary connection points can already be integrated into this flange connection. As a result of such a detachable connection, dismantling/installation, for example for repairs, will be appreciably simplified, which saves costs.

Advantageously, a rear flange plate of the first carrier frame section is connected in a detachable manner to a flange of the second carrier frame section and/or of a main frame section or of a self-supporting element of the vehicle. The rear flange plate and/or the flange advantageously have connection points which can be attached to one another. In this way a pre-installed module can be dismantled/installed without all the connecting lines needing to be separately connected or released beforehand/afterwards.

According to a further aspect of the invention, the carrier frame is advantageously designed as an additional frame, which is connected to a main frame or to self-supporting elements of the vehicle respectively.

BRIEF DESCRIPTION OF THE DRAWINGS

Further features and purposeful functions of the invention can be derived from the description of embodiments on the basis of the appended drawings. The figures show.

DETAILED DESCRIPTION OF EXAMPLE EMBOIMENTS

A first embodiment of the present invention is described hereinafter on the basis of the Figures.

Figure 1:
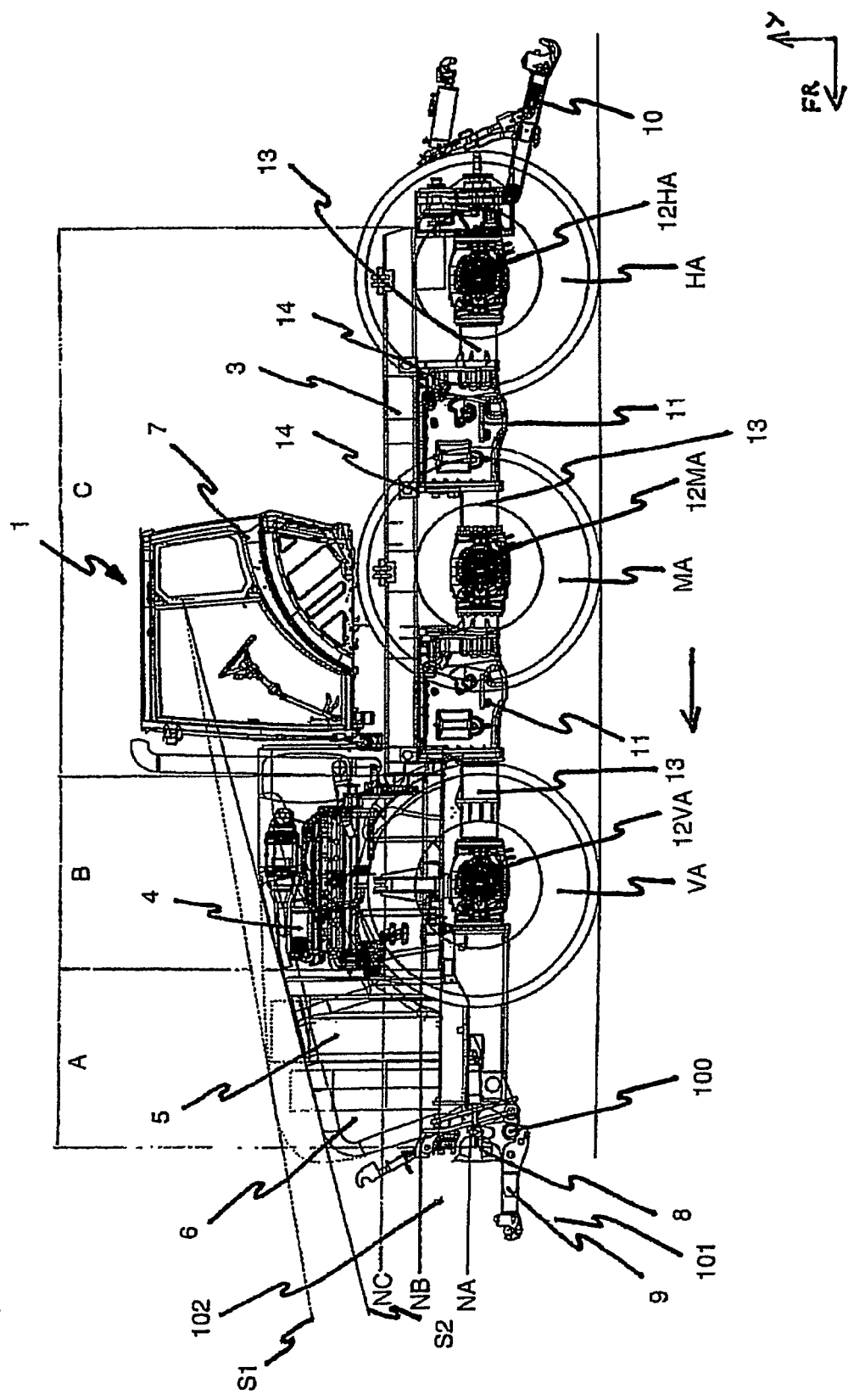
FIG. 1 An overall view of an agricultural tractor.

FIG. 1 shows a tractor 1 having a carrier frame 3 mounted above a transaxle assembly 2. The transaxle 2 comprises three axles, a front axle VA, a middle axle MA, and a rear axle HA, associated axle differentials 12VA, 12MA, 12HA, two transmission units 11 and various different connection housings 13. The assembly 2 extends from the front axle VA out beyond the rear axle HA.

Mounted above the carrier frame there is a combustion engine 4, a radiator package 5, which has a heat exchanger, a radiator fan, and ancillary elements, with an engine cover 6, and a driver's cab 7.

A front power take-off shaft 8 extends from the front of the tractor 1. The tractor further comprises a front linkage assembly 9 and a rear linkage assembly 10 for the attachment of implements.

The carrier frame 3 is divided horizontally into three part areas A, B, C. Allocated to these part areas are three height levels NA, NB, NC.

The height level NC is conditioned by the extension of the transmission units 11 in the vertical direction. In this area the carrier frame 3 accommodates the cab 7. In the area B, the carrier frame 3 adopts the height level NB, lower in comparison with NC, since the axle differential 12VA located beneath it is arranged appreciably lower than the transmission unit 11. Located in this area are the engine 4 and all other installations in the area of the engine.

After the axle differential 12VA, and therefore after the end of the physical extension of the transaxle 2 in the forwards direction of travel, the carrier frame 3 extends in the area A on the level NA. This part of the carrier frame 3 in the embodiment is bolted in a detachable manner to the area B (see FIG. 2). The radiator package 5 is located in this area. This area of the carrier frame 3 also accommodates the front power take-off shaft 8 and the front linkage assembly 9. The carrier frame 3 and the transaxle 2 are connected to one another by several connection points 14.

Figure 2:
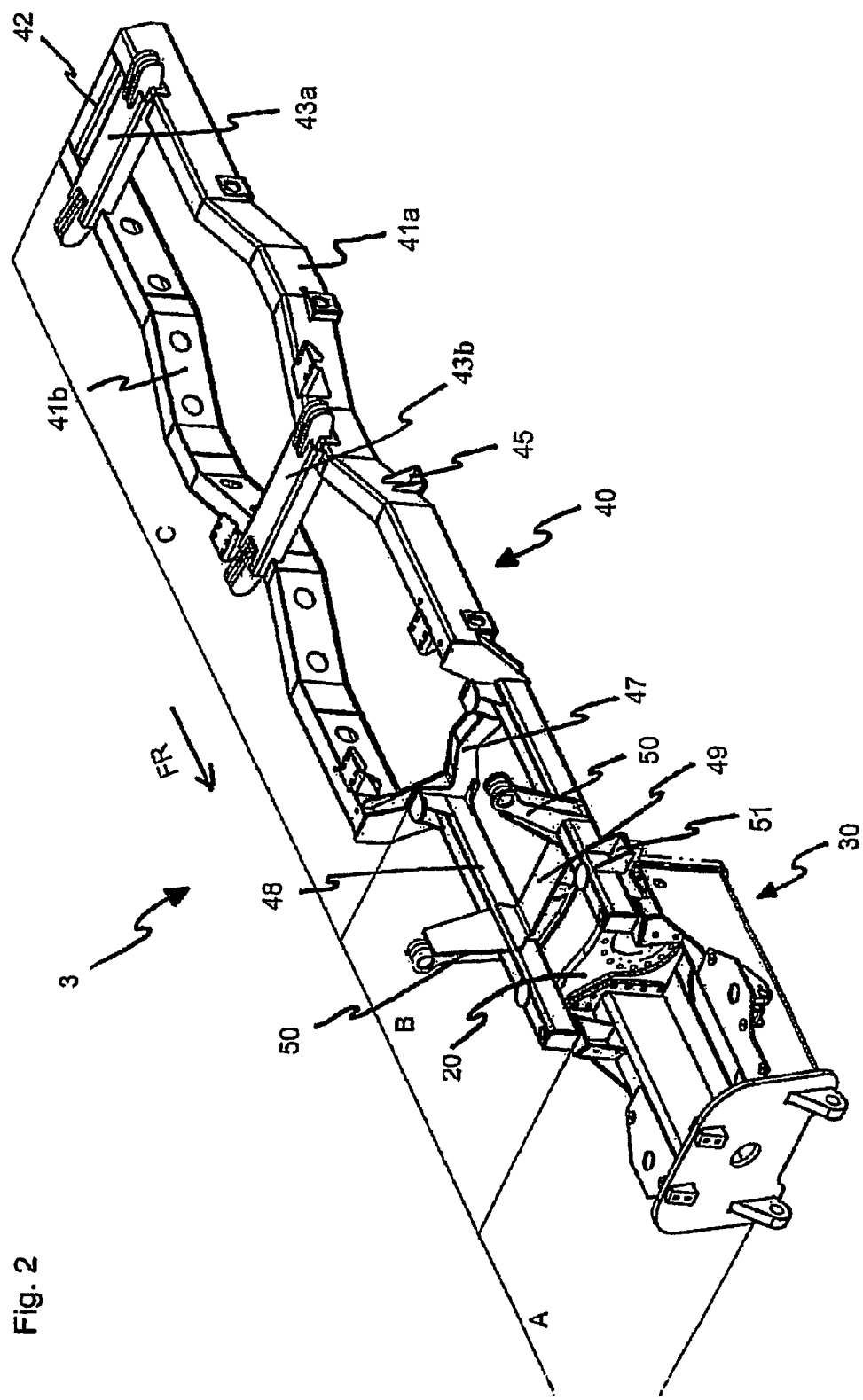
FIG. 2 A perspective view of a carrier frame.

FIG. 2 shows the carrier frame 3 with a front first carrier frame section 30 and a rear second carrier frame section 40. The first carrier frame section 30 is located in the area A and on the height level NA, while the second carrier frame section 40 extends in the areas B and C and on the height levels NB and NC respectively. Area B is defined by a first forward subsection of second section 40 whilst area C is defined by a second rearward subsection of second section 40.

The second subsection consists of a first longitudinal brace 41a running in the direction of travel FR and a second longitudinal brace 41b, which are connected by a first transverse brace 42, a second transverse brace 43a, and a third transverse brace 43b. Integrated on the transverse braces 43a and 43b are mountings for suspension cylinders for the axles MA and HA. In addition to this, connection lugs 45 are provided for connecting the carrier frame 3 and 40 respectively to the transaxle 2.

A further fourth transverse brace 47 implements the change in height level HC and HB of the carrier frame section 40. Further longitudinal braces 48 are provided for the first subsection. At the height of a fifth transverse brace 49, further mountings 50 are provided for suspension cylinders for the front axle. In addition, connection lugs 51 are provided for connecting the carrier frame 3 and 40 respectively to the transmission combination 2. The interface between the first and second carrier frame section 30, 40 is described in detail in FIG. 4 and FIG. 5.

Figure 3:
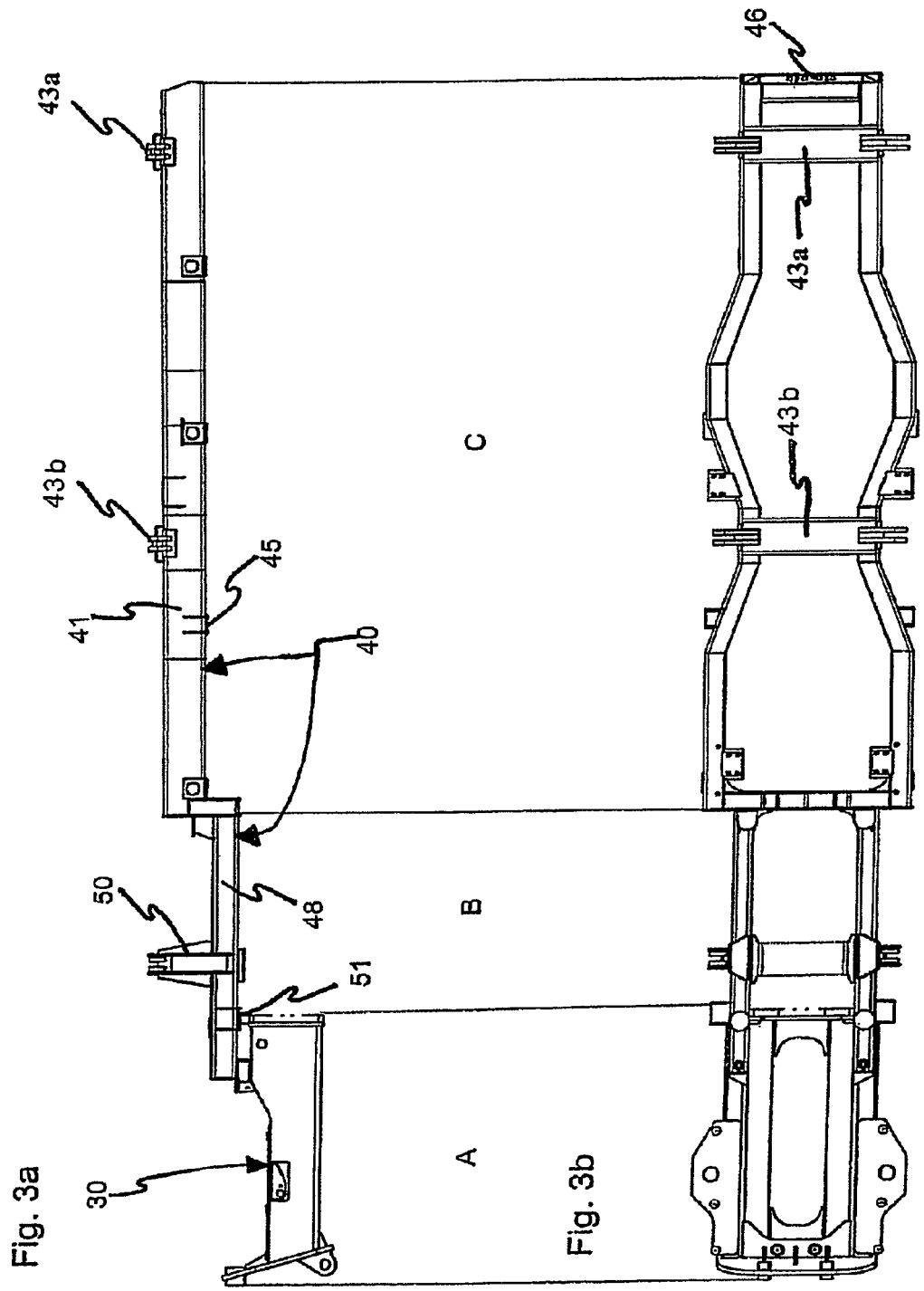
FIG. 3a A side view of the carrier frame.
FIG. 3b A plan view of the carrier frame.

FIG. 3a shows the carrier frame 3 in a side view and FIG. 3b shows the carrier frame 3 in a plan view. In the first transverse brace 42, in addition to the connection points 14, further securing points 46 are provided between the carrier frame 3, 40 and the transmission combination 2.

Figure 4:
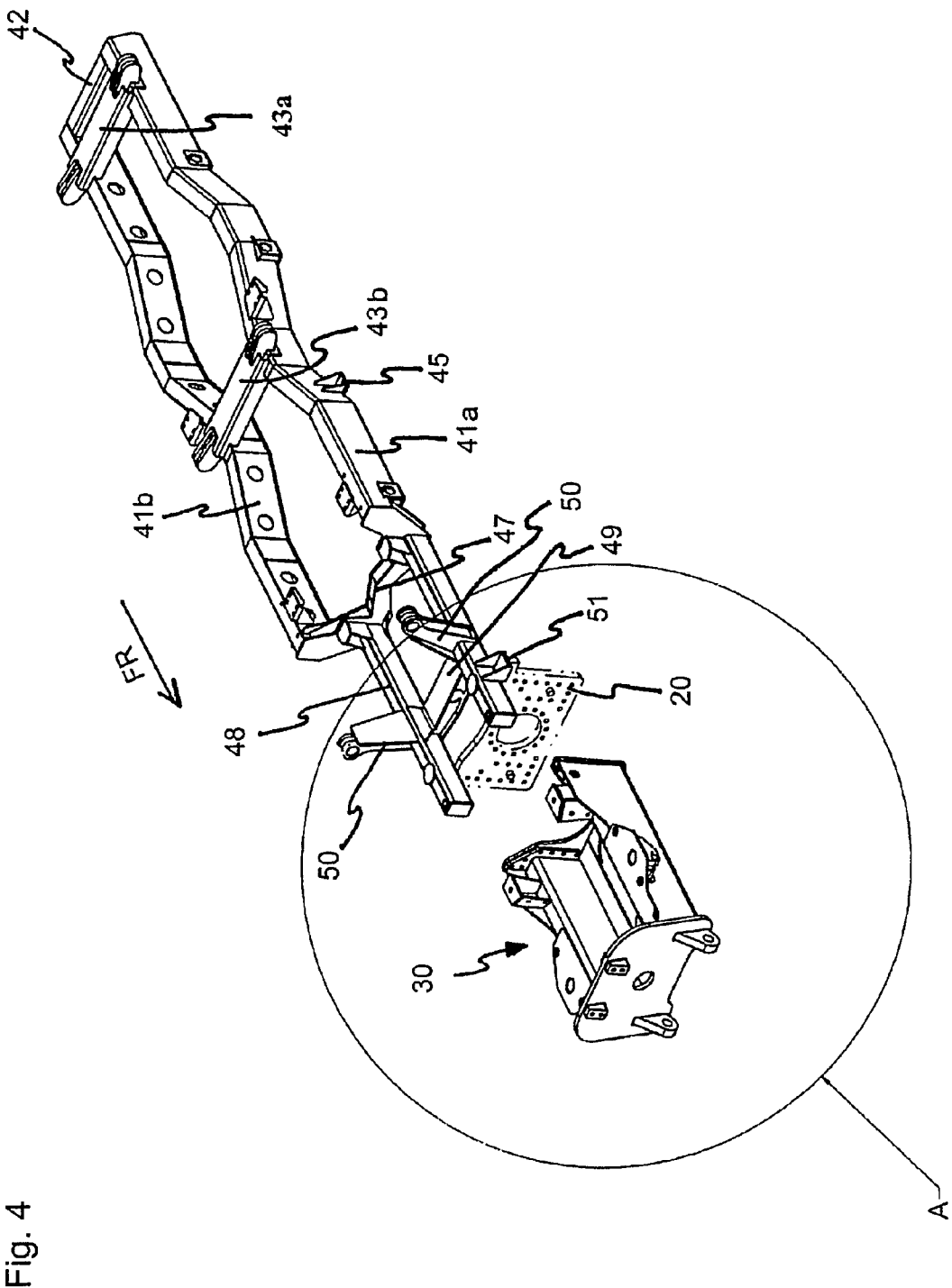
FIG. 4 A perspective view of the carrier frame in an exploded representation of the two frame parts.

FIG. 4 shows the carrier frame sections 30 and 40 as in FIG. 2, in a perspective representation. A flange 20 is represented as a broken line.

Figure 5:
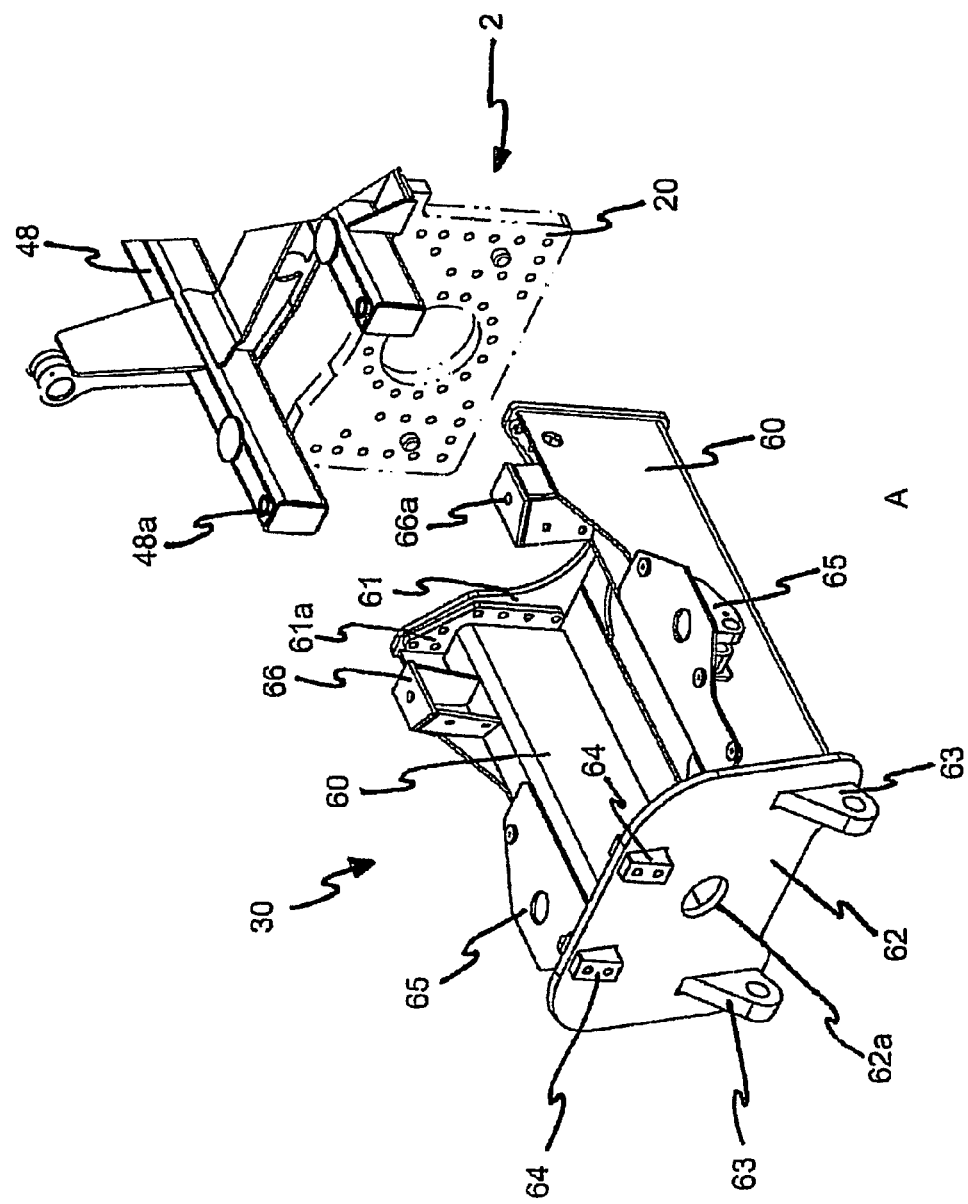
FIG. 5 A perspective view of the area A from FIG. 4.

FIG. 5 shows the area A from FIG. 4. The first carrier frame section 30 consists of two longitudinal braces 60, a rear flange plate 61, and a front flange plate 62. The rear flange plate 61 is provided with holes 61a, by which the carrier frame section 30 is bolted to the flange 20 of the transmission combination 2. In the front flange plate 62 are attachment eyes 63 as well as mounting bolsters 64 for a mounting bolster 91 of the front lifting mechanism 9.

Figure 6:
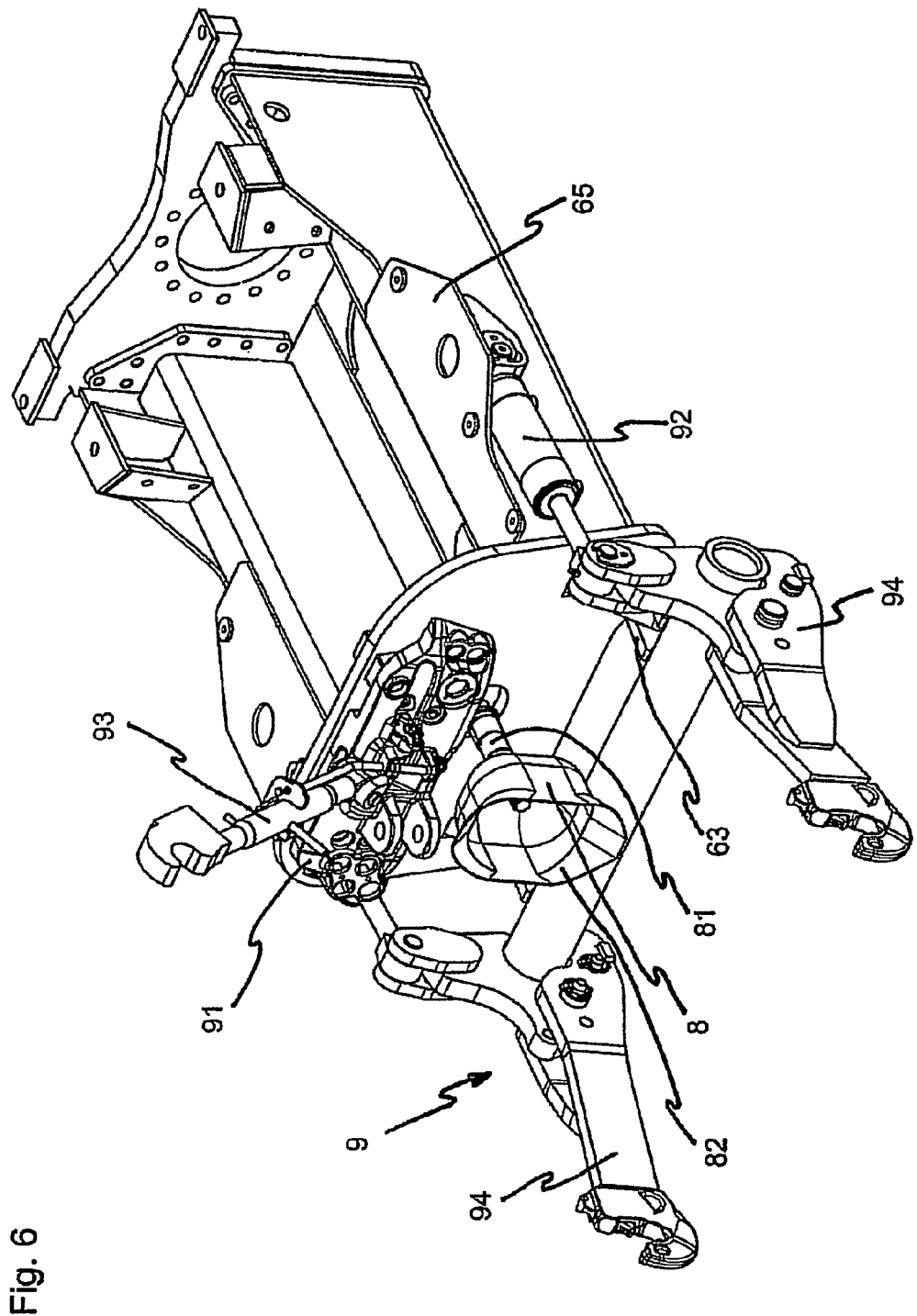
FIG. 6 A perspective view of the front carrier frame section.

Likewise provided in the front flange plate 62 is a through passage 62a for the front power take-off shaft 8. Provided on the side next to the longitudinal braces 60 are cylinder mounts 65, into which lifting cylinders 92 of the front lifting mechanism 9 are suspended, as represented in FIG. 6. Provided at the rear end of the first carrier frame section 30 are retaining elements 66, by means of which the first and second carrier frame sections 30, 40 are bolted to one another via holes 66a and 48a in the longitudinal braces 60.

FIG. 6 shows the connection of the front linkage assembly 9 and the power take-off shaft 8 with the first carrier frame section 30. The lifting cylinders 92 are connected to the cylinder retaining element 65. An upper link 93 is connected via the mounting bolster 91 to the first carrier frame section 30. Integrated in the bolster are further connection devices, such as hydraulic quick-action couplings or power sockets, with which attached equipment devices can be supplied with energy in order to drive both electrical as well as hydraulic motors or to illuminate the attached device. Lower links 94 are attached to the first carrier frame section 30 by means of the attachment eyes 63. The front power take-off shaft 8 is conducted by way of the through passage 62a (see FIG. 5) with a front power take-off shaft stub 81. The front power take-off shaft stub 81 is provided with a protective element 82.

It is also conceivable for the carrier frame to be designed as a single-piece welded component with at least one step gradation. The three areas A, B, and C could also be designed in each case as detachable. It would also be possible, on vehicles with a rear-mounted engine, for the carrier frame steps to be lowered to the rear.

A further embodiment would be to provide further flange plates on the front carrier frame section and/or a main frame section and/or a self-supporting element. In this way, rapid coupling connection points could be provided for the conducting material, energy, or information.

The invention claimed is:

1. A utility vehicle having a front end and a rear end and comprising a carrier frame mounted above a transaxle, which transaxle comprises a transmission unit and at least two axles, the carrier frame comprising a first section extending from the front end of the vehicle to a second section which extends to the rear end of the vehicle wherein a height of the first section is lower than a height of the second section, and wherein the second section comprises a first subsection disposed forwardly of, and lower than a second subsection and wherein the first section is mounted to the first subsection, the vehicle further comprising an engine mounted above the first subsection and a cab mounted above the second subsection.

2. A utility vehicle according to claim 1, wherein the first section, in a direction of travel, is provided in front of a front axle.

3. A utility vehicle according to claim 2, wherein the first section is located at or below a height level of the axles.

4. A utility vehicle according to claim 1, characterized in that at least one carrier frame section carries a pre-mounted module.

5. A utility vehicle according to claim 4, characterized in that the pre-mounted module is a radiator arrangement.

6. A utility vehicle according claim 1, wherein the first section is detachable from the second section.

7. A utility vehicle according to claim 6, characterized in that the first section has a front flange plate, a rear flange plate and two longitudinal braces.

8. A utility vehicle according to claim 7, characterized in that the rear flange plate of the first section can be connected in a detachable manner to a flange of the second section.

9. A utility vehicle according to claim 7, wherein an implement linkage arrangement is fixed to the front flange plate.

10. A utility vehicle according to claim 7, characterized in that the rear flange plate of the first section can be connected in a detachable manner to a main frame section of the utility vehicle.

11. A utility vehicle according to claim 10, wherein the first section is located at or below a height level of the axles.

12. A utility vehicle according to claim 1, wherein said transmission unit is located between the two axles, and wherein the first subsection is located at or below a height level of the transmission unit.

13. A utility vehicle according to claim 1 comprising three drivable axles.

* * * * *